Figure 1:
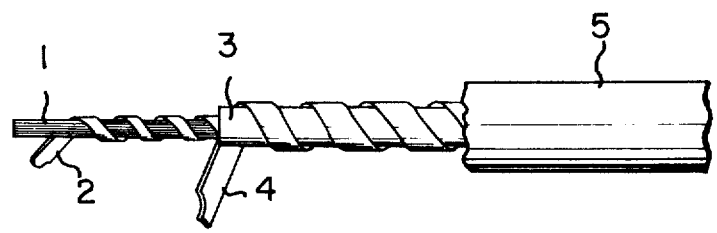

United States Patent
Kishimoto et al.

[11] 3,901,95:
[45] Aug. 26, 197:

[54] POLYMERIC THERMO-DETECTIVE MATERIAL

[75] Inventors: Yoshio Kishimoto, Hirakata; Kazumasa Yamamoto, Toyonaka, both of Japan

[73] Assignee: Matsushita Electric Industrial Co., Ltd., Kadoma, Japan

[22] Filed: Dec. 11, 1972

[21] Appl. No.: 313,796

[30] Foreign Application Priority Data
Dec. 14, 1971 Japan.............................. 46-101589
Mar. 31, 1972 Japan.............................. 47-32902

[52] U.S. Cl............................. 260/841; 260/78 SC
[51] Int. Cl.[2]........................ C08G 41/04; C08G 37/16
[58] Field of Search............................ 260/841

[56] References Cited
UNITED STATES PATENTS

| | | |
|---|---|---|
| 2,378,667 | 6/1945 | Vaala.............................. 260/841 |
| 2,388,676 | 11/1945 | Coffman........................... 260/84 |
| 2,412,054 | 12/1946 | McClellan......................... 260/84 |
| 2,484,523 | 10/1949 | McClellan......................... 260/84 |
| 3,261,884 | 7/1966 | Gorton............................ 260/84 |
| 3,379,697 | 4/1968 | Mourik........................... 260/84 |
| 3,492,275 | 1/1970 | Bigot............................ 260/841 |
| 3,808,289 | 4/1974 | Okuhashi......................... 260/841 |

*Primary Examiner*—Paul Lieberman
*Attorney, Agent, or Firm*—Stevens, Davis, Miller & Mosher

[57] ABSTRACT

A polymeric thermo-detective material is produced by molding a composition comprising nylon 11 or nylon 12 and an acid-catalyzed condensation product of a compound having at least one phenolic hydroxyl group and an aldehyde having a degree of polymerization of 20 or less. The thus obtained thermo-detective material has improved properties especially in resistance for moisture.

7 Claims, 2 Drawing Figures

POLYMERIC THERMO-DETECTIVE MATERIAL

This invention relates to a polymeric thermo-detective material. More particularly, this invention relates to a polymeric thermo-detective material used in a flexible linear thermo-detective wire which is employed in a thermo-detective device, for example, a heat-sensitive heater for controlling temperature of a flat heating apparatus such as an electric blanket, an electric sheet, an electric carpet or the like.

Thermo-detective materials of this kind have not only the temperature-regulating function but also the function of intercepting the heating circuit by fusing themselves in a narrow temperature range when heating apparatuses are heated to an abnormal high temperature. As the polymeric thermo-detective materials for use in the purpose as mentioned above, there have been proposed polymeric resistors comprising plasticized polyvinyl chloride composition or nylon and a small amount of surface active agents which give ionic electroconductivity thereto. The thermo-detective wire comprising the above-mentioned polymeric resistor is excellent in sensitivity to thermal detection but it cannot be used as a heat-sensitive heater with thermo-detective material which is the object of the present invention, since the electro-conductive carrier of it is an ionic substance which cannot be applied to direct current.

Structure of a heat-sensitive heater with thermo-detective material is as shown in FIG. 1. In FIG. 1, inner detecting wire 2, which is wound around core wire 1, is used as a heater and also detects signals produced between outer detecting wire 4 and itself. Polymeric thermo-detective material 3 is placed between inner and outer detecting wires 2 and 4 and all of them are covered by insulating outer covering 5. In the inner detecting wire 2, direct current or half-wave rectified current may be applied, which heats the wire 2. Thermal detection is carried out by passing alternating current through the material between the both detecting wires to obtain thermal signals. According to this method, i.e. a method of using a heat-sensitive heater in which a heat-sensitive wire and a heater are combined together, since direct or half-wave rectified current is applied to the inner detecting wire, the strength of electric field applied to the thermo-detective material is different in the different parts of the wire, so that a thermo-detective material which does not show spot polarization by the direct current is required.

On the other hand, a polyamide resin such as nylon 11 or nylon 12 or polypropylene, containing no impurities, has been used for a thermal fuse to prevent overheat by melting over about 175°C. Since polyamide resins are highly crystalline and have sharp melting points and low viscosity at molten state, they are used as thermal fuses preferably. Further polyamide resins have another advantage that they show great temperature dependence of dielectric constants particularly in the temperature range of from 30° to 120°C different from other polymers. Therefore, impedance of polyamide resin changes according to the change of temperature. But polyamide resins have an important defect in that they are easily affected by moisture. In general polyamide resins are highly hygroscopic and even nylon 11 and nylon 12, which are the least hygroscopic in the polyamide resins, show about 1.5–2 percent of moisture content and one-half to one-third of decrease in impedance when they are let stand under damp atmosphere. Therefore it has long been desired to obtain a polyamide resin improved in hygroscopic property which can control temperature accurately without being affected by moisture.

An object of the present invention is to provide a polymeric thermo-detective material using a polyamide resin as a base polymer which has improved properties such as high temperature coefficient with regard to impedance and high resistance to moisture.

Another object of the present invention is to provide an improving agent for a polyamide resin used for a polymeric thermo-detective material.

The present invention provides a polymeric thermo-detective material comprising a polyamide resin and an acid-catalyzed condensation product of a compound having at least one phenolic hydroxyl group and an aldehyde having a degree of polymerization of 20 or less.

As the polyamide resin, nylon 11 and nylon 12 are preferably used alone or in admixture. As nylon 11 and nylon 12, conventional ones may be employed.

As the condensation product of a compound having at least one phenolic hydroxyl group and an aldehyde, that having a degree of polymerization of 20 or less is necessary. When a degree of polymerization of a condensation product is over 20, activity of phenol moieties in the condensation product undesirably decreases and the obtained mixture of a polyamide and the condensation product may give a rigid and brittle product. On the other hand, when a compound having at least one phenolic hydroxyl group itself is used instead of a condensation product thereof with an aldehyde, many disadvantages are caused by volatility of the phenol.

As the compound having at least one phenolic hydroxyl group, alkyl phenols, di-alkyl phenols, alkyl hydroxybenzoates, di-hydroxy-diphenyl, and the like, may be used preferably. It is preferable to use alkyl phenols or di-alkyl phenols having $C_4 - C_{30}$ alkyl groups, for example, butyl phenol, amyl phenol, octyl phenol, nonyl phenol, dodecyl phenol, stearyl phenol, di-undecylphenol, di-butyl phenol, di-dodecyl phenol, di-stearyl phenol, and the like. Longer alkyl group of an alkyl phenol or di-alkyl phenol affords more flexibility to the polyamide resin to be mixed. Alkyl hydroxybenzoates used in the present invention may include reaction products of a hydroxybenzoic acid and an alcohol of the formula R—OH wherein R is alkyl preferably having 1–30, more preferably 4–18 carbon atoms. As the hydroxybenzoic acid, p-hydroxybenzoic acid and salicylic acid are preferable. Examples of alkyl hydroxybenzoate are 2-ethylhexyl p- or o-hydroxybenzoate, butyl p- or o-hydroxybenzoate, octyl p- or o-hydroxybenzoate, dodecyl p- or o-hydroxybenzoate, stearyl p- or o-hydroxybenzoate, and the like. In the case of an alkyl hydroxybenzoate having $C_1-C_3$ alkyl, it is preferable to react, for example, o- or p-hydroxylbenzoic acid with formaldehyde first and then to esterify the resulting condensation product. Some of the alkyl hydroxybenzoates are on the market as plasticizer for nylon and have good effect on improving hygroscopicity of nylon but they cannot be used alone in the present invention since they are greatly volatile at elevated temperatures.

As the aldehyde, formaldehyde, paraformaldehyde, benzaldehyde are preferably used.

The condensation reaction of a compound having at least one phenolic hydroxyl group and an aldehyde is carried out in the presence of an acid catalyst such as hydrochloric acid, sulfuric acid, phosphoric acid and the like preferably at a pH of 3 or below. Preferable reaction temperature is between about 80°C and 180°C. The amount of an aldehyde to be used is preferably about 0.5 to 1.0 mole per mole of a compound having at least one phenolic hydroxyl group.

The thus obtained polymer having a degree of polymerization of 20 or less is linear and has, for example, the formula,

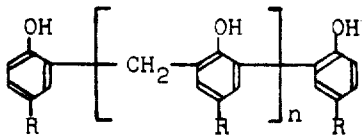

wherein R is alkyl and $n$ is an integer of 1 to 18, in the case of an alkyl phenol of

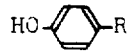

is used, or the formula,

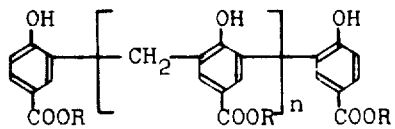

wherein R and n are as defined above, in the case of using an alkyl p-hydroxybenzoate. Since the alkyl group(s) or alkyl substituted carboxyl group(s) attached to the benzene ring of the starting compound may take the ortho, meta or para position, the obtained polymer may also have different orientations.

The above-mentioned novolac type resin is thermoplastic and has excellent compatibility with a polyamide resin.

The condensation product such as novolac type resin is then mixed with a polyamide resin by a conventional method. It is preferable to mix 5 to 30 parts by weight of the condensation product with 100 parts by weight of the polyamide resin.

The thus obtained mixed composition is molded to a thermo-detective material, for example, as shown in FIG. 1 by conventional molding processes. The thermo-detective material of the present invention has excellent physical and chemical properties such as excellent resistance to moisture and deterioration, excellent elasticity and flexibility and the like.

The invention is illustrated but not limited by the following Examples in which parts are by weight.

EXAMPLE 1

Di-undecyl-phenol (1 mole) was reacted with 0.75 mole of formalin (37% aqueous solution) in the presence of hydrochloric acid acidic catalyst at reflux temperature (about 100°C) for an hour. The obtained oligomer having an average degree of polymerization of 10, was separated and purified. The dried oligomer (15 parts) was blended with 100 parts of nylon 12 in dry state and the resulting mixture was dried and aged in a thermostat at 100°C for 15 hours. Then the aged mixture was formed into gut-like form by an extruder and into pellet by a cutter. After dried, the pellet was molded into a thermo-detective material used in a heat-sensitive heater by a wire-forming extruder.

EXAMPLE 2 p-Nonyl phenol (1 mole) was reacted with 0.75 mole of formalin (37% aqueous solution) in the presence of hydrochloric acid acidic catalyst at reflux temperature (100°C) for an hour. The obtained oligomer having an average degree of polymerization of 5, was separated and purified. Using a similar procedure to Example 1, a thermo-detective material used in a heat-sensitive heater was molded from a mixture of 100 parts of nylon 12 and 15 parts of the oligomer.

EXAMPLE 3

2-Ethylhexyl p-hydroxybenzoate (1 mole) was reacted with 0.75 mole of formalin (37% aqueous solution) in the presence of sulfuric acid acidic catalyst at reflux temperature for an hour. The obtained condensate has the repeating unit of the formula,

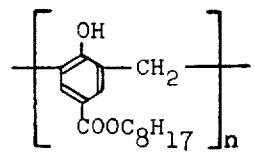

wherein $n$ is 3–7. After purification, 15 parts of the condensate was blended with 100 parts of nylon 12 and the resulting mixture was molded into a thermo-detective material used in a heat-sensitive heater using a similar procedure to Example 1.

EXAMPLE 4

Salicylic acid (1 mole) was reacted with 0.90 mole of formalin (37% aqueous solution) in the presence of sulfuric acid acidic catalyst at reflux temperature for 1.5 hours. The obtained resinous product was dissolved in a 10% NaOH solution. To the resulting solution, 1.5 moles of methyl p-toluene-sulfonate was added and the reaction was carried out with stirring at reflux temperature for 1–2 hours. After the reaction, the product was filtered, washed and purified. The thus obtained methyl ester of salicylic acid-formaldehyde resin having an average degree of polymerization of 20 (15 parts) was blended with 100 parts of nylon 11 and the resulting mixture was molded into a thermo-detective material used in a heat-sensitive heater using a similar procedure to Example 1.

Physical properties of the polymeric thermo-detective materials obtained according to Examples 1–4 of the present invention and those obtained according to a conventional method are as shown in Table 1. In Table 1, Comparative Example 1 is the case in which nylon 12 alone is used. Comparative Example 2 is the case in which a mixture of 100 parts of nylon 12 and 15 parts of nonyl phenol-formaldehyde resin having an average degree of polymerization of 300 is used. As is clear from Table 1, Comparative Example 1 is inferior in moisture absorption, thermistor B constant and resistance for moisture, and Comparative Example 2 is inferior in thermistor B constant and resistance for moisture to Examples 1–4 of the present invention.

Figure 2:
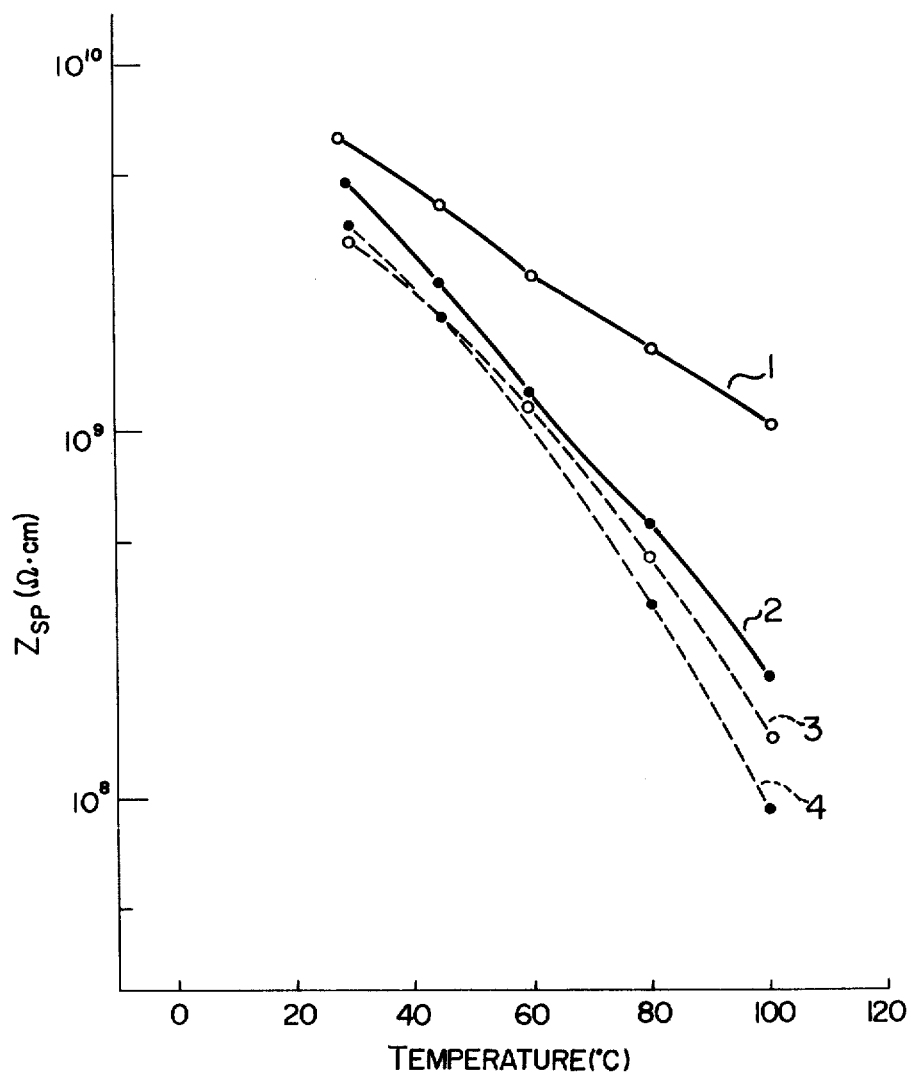

The relation between impedance of thermo-detective material and temperature is illustrated in FIG. 2. In FIG. 2, curve 1 shows impedances at absolutely dried state of Comparative Example 1, curve 2 shows impedance at absolutely dried state of Example 1, curve 3 shows impedances at equilibrium hygroscopic state of Comparative Example 1, and curve 4 shows impedances at equilibrium hygroscopic state of Example 1. FIG. 2 shows that Example 1 is superior to Comparative Example 1 in resistance for moisture.

As mentioned above, the thermo-detective material of the present invention has many practical advantages such as excellent resistance for moisture, excellent thermal stability, being suitable for long term application without losing accuracy and for commercial scale production.

Table 1

| Sample | Example 1 | Example 2 | Example 3 | Example 4 | Comparative Example 1 | Comparative Example 2 |
| --- | --- | --- | --- | --- | --- | --- |
| Impedance at room temp. ($\Omega \cdot cm$) | $4.8 \times 10^9$ | $5.3 \times 10^9$ | $4.7 \times 10^9$ | $4.0 \times 10^9$ | $6.4 \times 10^9$ | $7.3 \times 10^9$ |
| Thermistor B const. $B_Z$ (30°–60°C) (°K) | 4300 | 4100 | 4400 | 4600 | 2000 | 1600 |
| Resistance for moisture $\Delta Z_M = Z_D/Z_W$ | 1.2 | 1.25 | 1.23 | 1.26 | 2.00 | 1.7 |
| Moisture absorption at 45°C, 95% RH (%) | 0.94 | 0.94 | 0.96 | 0.98 | 1.31 | 0.96 |
| Heat resistance $\Delta Z_H = Z_{300}/Z_0$ | 1.9 | 1.85 | 1.7 | 1.9 | 1.6 | 1.7 |
| Heating weight loss at 120°C (%) | 1.55 | 1.32 | 1.27 | 1.32 | 0.25 | 1.25 |

Note:
1. Thermistor $B_Z$ constant is a thermal coefficient of impedance at 30°–60°C, obtained by calculating the equation, $Z = Z_0 \exp(B_Z/T)$; wherein Z is impedance, $Z_0$ is a constant and T is an absolute temperature.
2. $Z_D$ is impedance at absolutely dried state and $Z_W$ is impedance at equilibrium hygroscopic state of 45°C, 95% RH.
3. $Z_{300}$ is impedance after heated at 120°C for 300 hours and $Z_0$ is impedance at the starting point.
4. The impedance is measured according to ASTM D257.
5. The test pieces are prepared by forming a piece of sheet of 100 mm-by-100 mm square with 1 mm thick from pellets using a hot press.

What is claimed is:

1. A polymeric material used for flexible thermodetective wire comprising nylon 11, nylon 12, or a mixture thereof and
an acid-catalyzed condensation product of a compound having at least one phenolic hydroxyl group and an aldehyde having a degree of polymerization of 20 or less, said acid-catalyzed condensation product being present in an amount of 5 to 30 parts by weight per 100 parts by weight of the nylon.

2. A polymeric thermo-detective material according to claim 1, wherein the compound having at least one phenolic hydroxyl group is an alkyl phenol, a di-alkyl phenol, an alkyl hydroxybenzoate, or a dihydroxydiphenyl.

3. A polymeric thermo-detective material according to claim 1, wherein the aldehyde is formaldehyde, paraformaldehyde or benazldehyde.

4. A polymeric thermo-detective material according to claim 1, wherein the compound having at least one phenolic hydroxyl group is an alkyl phenol and the aldehyde is formaldehyde.

5. A polymeric thermo-detective material according to claim 1, wherein the compound having at least one phenolic hydroxyl group is an alkyl hydroxybenzoate and the aldehyde is formaldehyde.

6. A polymeric thermo-detective material according to claim 2, wherein the alkyl phenol or di-alkyl phenol has a $C_4$–$C_{30}$ alkyl group.

7. A polymeric thermo-detective material according to claim 2, wherein the alkyl hydroxybenzoate is prepared by reacting a hydroxybenzoic acid with an alcohol of the formula R–OH in which R is a $C_1$–$C_{30}$ alkyl group.

* * * * *